R. L. HOFFMAN.
CLAMPING EAR FOR TROLLEY WIRES.
APPLICATION FILED OCT. 8, 1907.
917,069.
Patented Apr. 6, 1909.
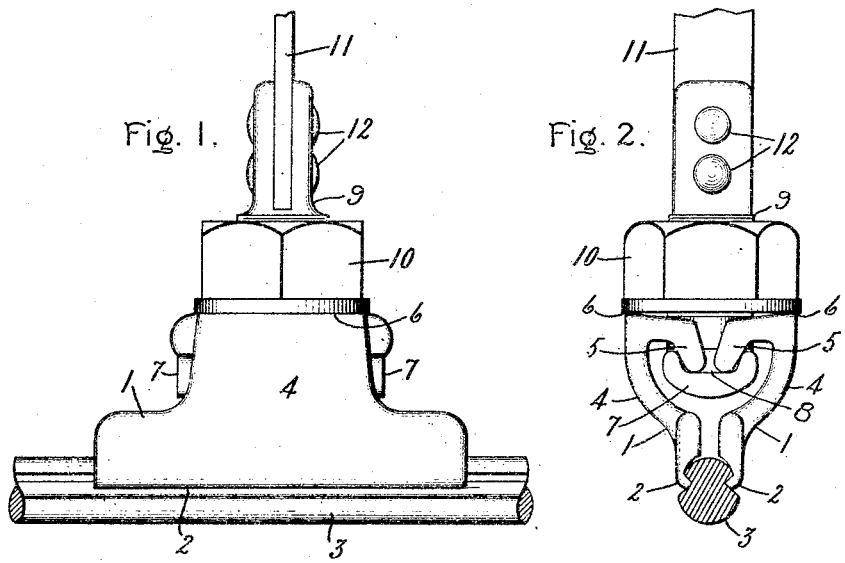
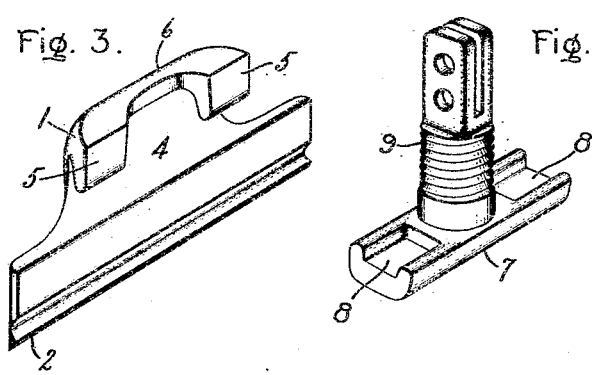
Witnesses:
George W. Tilden
J. Ellis Glen.
Inventor:
Ralph L. Hoffman,
by Albert H. Davis
Att'y.

UNITED STATES PATENT OFFICE.

RALPH L. HOFFMAN, OF SCHENECTADY, NEW YORK, ASSIGNOR TO GENERAL ELECTRIC COMPANY, A CORPORATION OF NEW YORK.

CLAMPING-EAR FOR TROLLEY-WIRES.

No. 917,069.　　　Specification of Letters Patent.　　　Patented April 6, 1909.

Application filed October 8, 1907. Serial No. 396,394.

*To all whom it may concern:*

Be it known that I, RALPH L. HOFFMAN, a citizen of the United States, residing at Schenectady, county of Schenectady, State of New York, have invented certain new and useful Improvements in Clamping-Ears for Trolley-Wires, of which the following is a specification.

This invention relates to overhead electric railways, and its object is to provide an improved clamping ear for suspending the overhead conductor from the arm of a trolley pole, a span wire, a messenger wire, or the like.

The invention comprises two duplicate clamping jaws, a hanger on which the jaws are suspended, and a nut bearing on shoulders on said jaws to force them into engagement with the sides of the trolley wire.

In the accompanying drawing, Figure 1 is a side elevation of one embodiment of the invention; Fig. 2 is an end view of the same; Fig. 3 is a perspective view of one jaw; and Fig. 4 is a perspective view of the hanger.

The jaws 1 are duplicates, each having a longitudinal tooth 2 along its lower edge to engage in a side-groove in the trolley wire 3. The jaws have diverging cheeks 4, from the upper edges of which the fulcrum hooks 5 extend inwardly and downwardly, leaving shoulders 6 standing above the ends of said hooks, and at one side of the bearing points thereof. A hanger 7, in the shape of an inverted T, is arranged to receive and support said hooks, its arms having recesses 8 in their upper sides to receive them. The shank 9 of said hanger extends up between the hooks, and carries means for forcing down the shoulders of the jaws to cause their teeth to engage with the trolley wire. For this purpose, I prefer to screw-thread the shank to receive a nut 10 whose diameter is great enough to enable it to bear upon the shoulders 6 of the jaws. Above the nut, the shank is constructed to be suspended from a suitable support; being, for example, forked to admit the rod 11, to which it is secured by rivets 12.

To assemble the device, the jaws are first hooked into the recesses in the hanger, and then the nut is screwed down. The recesses are of sufficient depth to prevent the hooks from becoming disengaged until the nut has been slacked off considerably, and before that point is reached, the jaws can be swung open far enough to admit the trolley wire. It is therefore never necessary to unscrew the nut enough to permit the jaws to slip out, unless it be desired to remove them for repair or replacement. By turning the nut down on the shoulders 6 the jaws are swung toward each other and are caused to clamp the trolley wire tightly.

The device is simple to construct, requiring but little machining; and it can be quickly assembled and applied to a trolley wire, or disengaged therefrom and taken apart, as may be desired.

What I claim as new and desire to secure by Letters Patent of the United States is,—

1. A clamping ear for trolley wires, comprising a hanger, two jaws fulcrumed thereon, each having an elevated shoulder at one side of the vertical plane of suspension, and means for forcing down said shoulders.

2. A clamping ear for trolley wires, comprising a hanger having recesses, two jaws having fulcrums engaged in said recesses and provided with shoulders above and at one side of the said fulcrums, and means for forcing down said shoulders.

3. A clamping ear for trolley wires, comprising a hanger having a screw-threaded shank and arms containing recesses, two jaws having hooks on their upper edges engaged with said recesses and provided with shoulders standing above and at one side of the bearing points of said hooks, and a nut on said shank bearing on said shoulders.

In witness whereof, I have hereunto set my hand this 7th day of October, 1907.

RALPH L. HOFFMAN.

Witnesses:
　BENJAMIN B. HULL,
　HELEN ORFORD.